(12) United States Patent
Braskich et al.

(10) Patent No.: US 7,734,052 B2
(45) Date of Patent: Jun. 8, 2010

(54) METHOD AND SYSTEM FOR SECURE PROCESSING OF AUTHENTICATION KEY MATERIAL IN AN AD HOC WIRELESS NETWORK

(75) Inventors: Anthony J. Braskich, Palatine, IL (US); Stephen P. Emeott, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 256 days.

(21) Appl. No.: 11/470,921

(22) Filed: Sep. 7, 2006

(65) Prior Publication Data

US 2008/0063204 A1 Mar. 13, 2008

(51) Int. Cl.
*H04L 9/08* (2006.01)

(52) U.S. Cl. .................. 380/277; 713/171; 380/281; 380/284

(58) Field of Classification Search .......... 713/171; 380/259–266, 270, 284, 277, 281
See application file for complete search history.

(56) References Cited

U.S. PATENT DOCUMENTS

| | | | |
|---|---|---|---|
| 6,983,167 B2 | 1/1996 | Adachi et al. | |
| 5,572,528 A | 11/1996 | Shuen | |
| 7,016,949 B1 | 3/2006 | Tagawa | |
| 7,039,068 B1 | 5/2006 | Halasz | |
| 7,171,555 B1 | 1/2007 | Salowey et al. | |
| 7,197,643 B2 | 3/2007 | Takase | |
| 7,231,530 B1 | 6/2007 | Miller et al. | |
| 7,263,357 B2 * | 8/2007 | Lee et al. .................. | 455/432.1 |
| 7,275,157 B2 * | 9/2007 | Cam Winget ............... | 713/168 |
| 7,418,596 B1 | 8/2008 | Carroll et al. | |
| 7,502,331 B2 | 3/2009 | Dommety et al. | |
| 7,508,803 B2 | 3/2009 | Emeott et al. | |
| 7,529,933 B2 | 5/2009 | Palekar et al. | |
| 2002/0184055 A1 | 12/2002 | Naghavi et al. | |
| 2002/0184487 A1 | 12/2002 | Badamo et al. | |
| 2003/0236982 A1 | 12/2003 | Hsu | |
| 2004/0093522 A1 | 5/2004 | Bruestle et al. | |
| 2004/0103282 A1 * | 5/2004 | Meier et al. .................. | 713/171 |
| 2004/0240412 A1 | 12/2004 | Winget | |
| 2004/0258092 A1 | 12/2004 | Sugaya | |

(Continued)

OTHER PUBLICATIONS

IEEE P802.11r/D2.2, "Key Distribution for Fast BSS Transition," Part 11 - Amendment 2: Fast BSS Transition - Section 8.5A - Jul. 2006 - pp. 24-30.

(Continued)

*Primary Examiner*—Gilberto Barron, Jr.
*Assistant Examiner*—Hadi Armouche
(74) *Attorney, Agent, or Firm*—Randi L. Karpinia (57) ABSTRACT

A method and system for secure processing of authentication key material in an ad hoc wireless network enables secure distribution of the authentication key material between a mesh authenticator (110) and a mesh key distributor (115), which may be separated by multiple wireless links. The method includes deriving a pairwise transient key for key distribution (PTK-KD) using a mesh key holder security information element (MKHSIE). A mesh authenticator pairwise master key (PMK-MA) is then requested using a first mesh encrypted key information element (MEKIE) that includes data origin information. Using the pairwise transient key for key distribution (PTK-KD), a second mesh encrypted key information element (MEKIE) is then decrypted to obtain the mesh authenticator pairwise master key (PMK-MA).

26 Claims, 9 Drawing Sheets

U.S. PATENT DOCUMENTS

| | | | |
|---|---|---|---|
| 2005/0041662 A1 | 2/2005 | Kuo et al. | |
| 2005/0223111 A1 | 10/2005 | Bhandaru et al. | |
| 2005/0249244 A1 | 11/2005 | McNamara et al. | |
| 2006/0002351 A1 | 1/2006 | Madour | |
| 2006/0062391 A1 | 3/2006 | Lee et al. | |
| 2006/0111045 A1 | 5/2006 | Orlassino et al. | |
| 2006/0198368 A1 | 9/2006 | Guichard et al. | |
| 2007/0162751 A1* | 7/2007 | Braskich et al. | 713/169 |
| 2007/0189249 A1* | 8/2007 | Gurevich et al. | 370/338 |
| 2007/0192600 A1* | 8/2007 | Wong et al. | 713/168 |
| 2007/0192605 A1 | 8/2007 | Mizikovsky et al. | |
| 2007/0206537 A1* | 9/2007 | Cam-Winget et al. | 370/331 |
| 2007/0250713 A1* | 10/2007 | Rahman et al. | 713/171 |
| 2007/0264965 A1 | 11/2007 | Taniguchi | |
| 2008/0063205 A1 | 3/2008 | Braskich et al. | |
| 2008/0065888 A1* | 3/2008 | Zheng et al. | 713/171 |

OTHER PUBLICATIONS

PCT/US07/76592 - PCT Search Report and Written Opinion - Mailed Jun. 4, 2008 - 9 pages.

IEEE P802.11s/D1.0, "Action Frame Format Details," Part 11 - Amendment 2: ESS Mesh Networking - Section 7.4 - Nov. 2006 - pp. 53-64.

IEEE Standard for Information Technology - Telecommunications and information exchange between systems - Local and metropolitan area networks - Specific requirements. Part 11: Wireless LAN Medium Access Control (MAC) and Physical Layer (PHY) specifications Amendment 6: Medium Access Control (MAC) Secunty Enhancements. Jun. 24, 2004. IEEE. p. 1-190.

U.S. Patent Office - U.S. Appl. No. 11/470,973 - Office Action mailed Jun. 27, 2008.

Aboba, B. et al. RFC: 3748 Extensible Authentication Protocol (EAP). Jun. 2004. IEEE. p. 1-63.

Funk, Paul et al. EAP Tunneled TLS Authentication Protocol (EAP-TTLS). Jul. 2004. p. 1-54.

PCT/US07/75439 - PCT Search Report and Written Opinion - mailed Jul. 7, 2008 - 9 pages.

U.S. Patent Office - U.S. Appl. No. 11/470,973 - Office Action mailed May 12, 2009 - 13 pages.

IEEE 802.11r/D2.2, 8A.2.1 - Part 11 - Amendment 2: Fast BSS Transition - Fast BSS Transition Initial Mobility Domain Association in an RSN - Jul. 2006 - pp. 39-42.

U.S. Patent Office - U.S. Appl. No. 11/470,980 - Office Action mailed Apr. 8, 2008 - 11 pages.

U.S. Patent Office - U.S. Appl. No. 11/470,980 - Non-final Office Action mailed Mar. 18, 2009 - 13 pages.

PCT/US07/076594 - PCT Preliminary Examination Report on Patentability - mailed Mar. 19, 2009 - 6 pages.

PCT/US07/76594 - PCT Search Report and Written Opinion - mailed Apr. 8, 2008 - 7 pages.

U.S. Patent Office - U.S. Appl. No. 11/470,980 - Final-Office Action mailed Oct. 16, 2008 - 12 pages.

U.S. Patent Office - U.S. Appl. No. 11/470,980 - Final Office Action mailed Nov. 30, 2009 - 17 pages.

PCT/US07/75429 - PCT Preliminary Examination Report on Patentability - mailed Mar. 19, 2009 - 8 pages.

U.S. Patent Office - U.S. Appl. No. 11/470,969 - Office Action mailed Jun. 19, 2008 - 11 pages.

PCT/US07/75429 - PCT Search Report and Written Opinion - mailed Sep. 9, 2008 - 11 pages.

\* cited by examiner

MESH KEY HOLDER SECURITY HANDSHAKE

MESH ENCRYPTED KEY INFORMATION ELEMENT (MEKIE)

*FIG. 7*

MESH KEY TRANSPORT PUSH PROTOCOL

METHOD AND SYSTEM FOR SECURE PROCESSING OF AUTHENTICATION KEY MATERIAL IN AN AD HOC WIRELESS NETWORK

FIELD OF THE INVENTION

The present invention relates generally to wireless communications and more particularly to security authentication and key management within an ad hoc wireless network.

BACKGROUND

Infrastructure-based wireless networks, such as cellular networks or satellite networks, typically include a communications network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, ad hoc networks are self-forming wireless networks which can operate in the absence of any fixed infrastructure, and in some cases an ad hoc network is formed entirely of mobile units. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network.

A mesh network is a form of an ad hoc wireless network based on autonomous collections of mobile nodes that communicate with each other over wireless links having limited bandwidths. Individual nodes in a mesh network can perform routing functions, which enable a mesh network to be reconfigured around blocked paths or poor connections by "hopping" from one node to another until a destination is reached. A mesh network is thus described as self-healing, as it can still operate effectively even when particular nodes break down or leave the network.

As wireless communications networks such as mesh networks become more prevalent, security continues to be a major concern to both communications network providers and end users. In a wireless communications mesh network the security environment can offer the greatest challenges since data may be readily received and manipulated by many nodes. The radio links used in a wireless communications mesh network expose signaling and other data traversing the network to eavesdroppers and/or would-be hackers. In a multi-hop wireless communications mesh network, this requires each link between the meshed devices to have a unique security association established through a multi-hop authentication and key management process. Frames sent over-the-air on the link then can be protected with established security associations.

BRIEF DESCRIPTION OF THE DRAWINGS

In order that the invention may be readily understood and put into practical effect, reference now will be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to secure processing of authentication key material in an ad hoc wireless network. Accordingly, the apparatus components and method steps have been represented where appropriate by conventional symbols in the drawings, showing only those specific details that are pertinent to understanding the embodiments of the present invention, so as not to obscure the disclosure with details that will be readily apparent to those of ordinary skill in the art having the benefit of the description herein.

In this document, relational terms such as left and right, first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of secure processing of authentication key material in an ad hoc wireless network as described herein. The non-processor circuits may include, but are not limited to, a radio receiver, a radio transmitter, signal drivers, clock circuits, power source circuits, and user input devices. As such, these functions may be interpreted as steps of a method for secure processing of authentication key material in an ad hoc wireless network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 1:
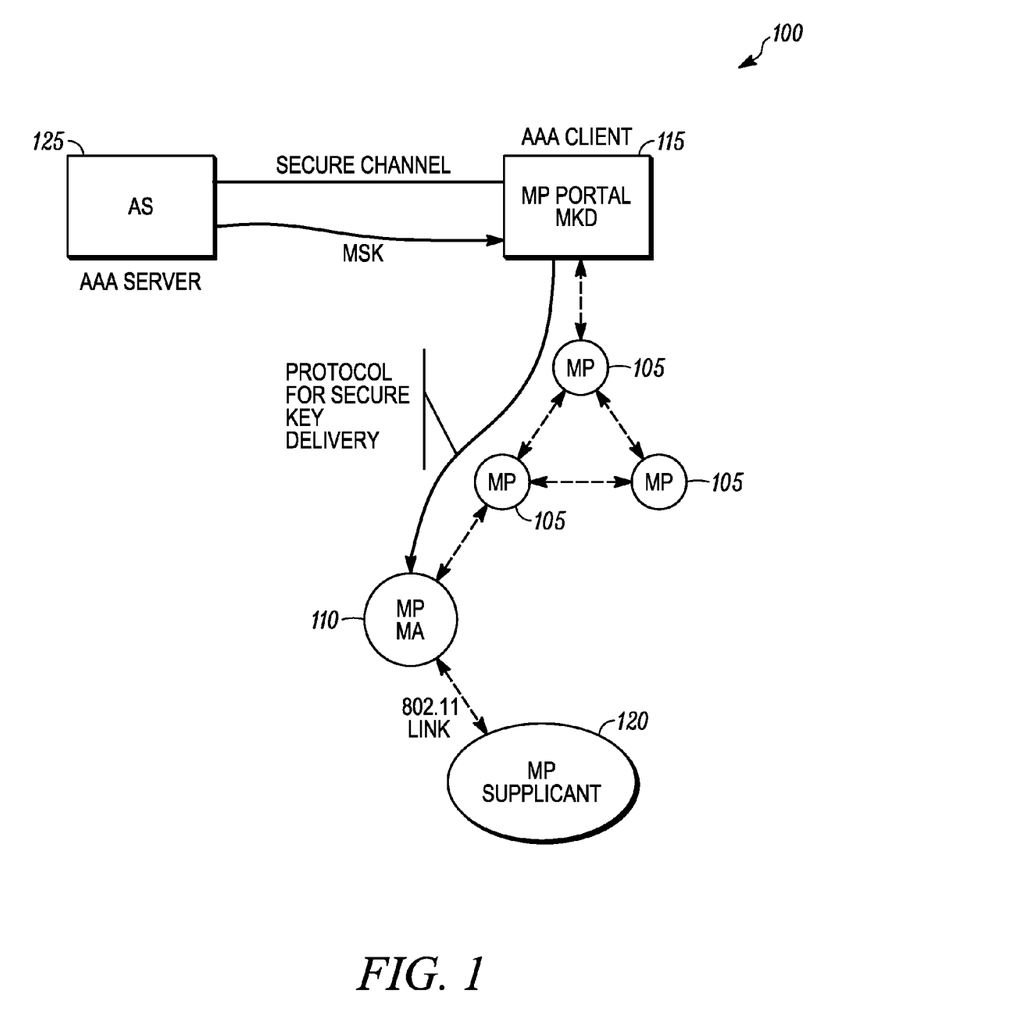
FIG. 1 is a diagram illustrating a wireless communications mesh network, according to some embodiments of the present invention.

Referring to FIG. 1, a diagram illustrates a wireless communications mesh network 100, according to some embodiments of the present invention. The network 100 comprises a plurality of mesh points (MPs) 105, also called mesh nodes, which can communicate with each other over the network 100 using wireless links such as links conforming to Institute of Electrical and Electronics Engineers (IEEE) 802.11 standards. Each MP 105 can comprise, for example, a mobile telephone, a two-way radio, a notebook computer or other wireless communication device. To provide secure communications between the MPs 105, a security association is established between a mesh authenticator (MA) 110 and a mesh key distributor (MKD) 115. The MA 110 is generally a MP 105 having special security qualifications. A mesh key holder security association is used to provide message integrity and data origin authenticity in all messages passed between the MA 110 and the MKD 115. Further, the mesh key holder security association provides encryption of derived keys and key context during key delivery protocols.

The MKD 115 can significantly improve the efficiency of a mesh security mechanism. The MKD 115 can obtain master key material for a mesh point (MP) supplicant 120 from an authentication server (AS) 125, which may act as an authentication, authorization and accounting (AAA) server, when the MP supplicant 120 first contacts the network 100. The master key material is then cached at the MKD 115, which acts as a AAA client. Keys derived from the cached master key material then can be used later to quickly establish security associations between the MP supplicant 120 and one or more MPs 105, without needing to obtain additional security information from the AS 125.

Embodiments of the present invention therefore provide secure key transport mechanisms between the MA 110 and the MKD 115. The secure key transport mechanisms are capable of distributing key material between nodes that are separated by multiple wireless links, and also provide data origin authenticity and message integrity protection between the MA 110 and the MKD 115.

According to some embodiments of the present invention, Efficient Mesh Security Association (EMSA) services can be used to permit efficient establishment of link security between two MPs 105 in the network 100. EMSA services are provided through the use of a mesh key hierarchy, which is a hierarchy of derived keys that is established through the use of a pre-shared key (PSK) or when a MP 105 performs IEEE 802.1X authentication. The operation of EMSA relies on mesh key holders, which are implemented at the MPs 105 within the network 100. Two types of mesh key holders are defined: mesh authenticators (MAs), such as the MA 110, and mesh key distributors (MKDs), such as the MKD 115.

With EMSA, information is exchanged during an initial association between an MP 105, such as the MP supplicant 120, and an MA, such as the MA 110, and is referred to as "Initial EMSA Authentication." Subsequent associations to other MAs within the same mesh security domain (and the same wireless local area network (WLAN) mesh, as identified by a Mesh ID) may then use an Abbreviated EMSA Handshake mechanism.

Mesh key holders, MAs and MKDs, manage the mesh key hierarchy by performing key derivation and secure key distribution. A mesh security domain is defined by the presence of a single MKD, such as the MKD 115, implemented at an MP 105 in the mesh. Within the mesh security domain, several MAs may exist, including for example the MA 110, each implemented at an MP 105, where each MA maintains both a route to and a security association with the MKD 115. The MKD 115 derives keys to create a mesh key hierarchy, and distributes derived keys to MAs such as the MA 110. A device implementing the MKD 115 may also implement a MA entity. The MA 110 participates in EMSA exchanges initiated by the MP supplicant 120 (including Initial EMSA Authentication and the Abbreviated EMSA Handshake). The MA 110 receives derived keys from the MKD 115, and derives additional keys for use in securing a link with the MP supplicant 120.

Figure 2:
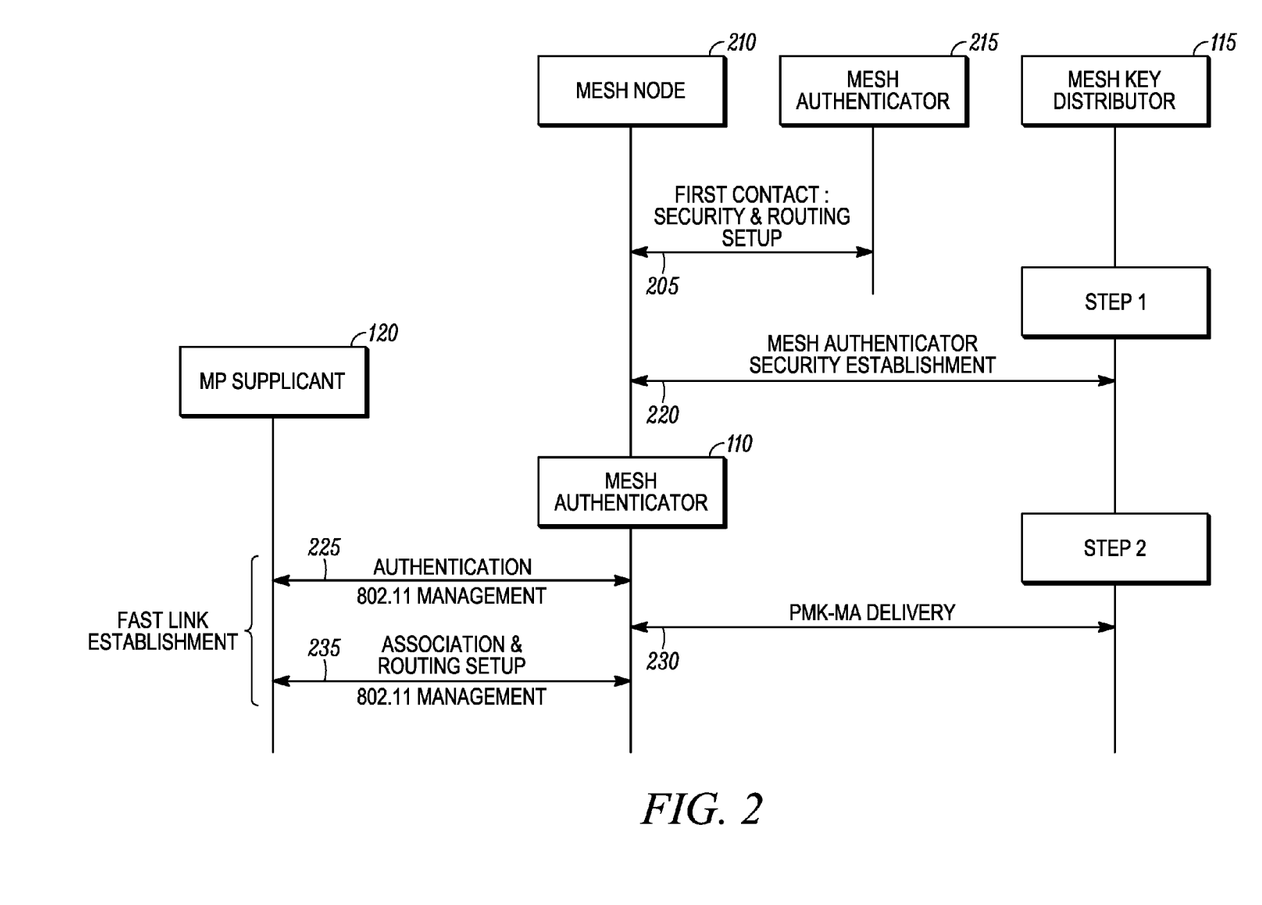
FIG. 2 is a message sequence chart illustrating interactions between elements of a wireless communications mesh network to provide secure key transport, according to some embodiments of the present invention.

Referring to FIG. 2, a message sequence chart illustrates interactions between elements of the wireless communications mesh network 100 to provide secure key transport, according to some embodiments of the present invention. At line 205, a mesh node 210, such as an MP 105, makes a first contact with a mesh authenticator 215, such as another MP 105, and completes initial security and routing setup procedures, which includes discovery of the MKD 115, during an initial EMSA authentication. At line 220, a mesh key holder security association is established via mesh action between the mesh node 210 and the MKD 115. Following establishment of the mesh key holder security association, the mesh node 210 then becomes the MA 110, and can serve as a mesh authenticator for other MPs 105. For clarity, in the remainder of this specification the mesh node 210 is referred to only as the MA 110. Lines 225, 230 and 235 illustrate a fast link establishment that connects the MP supplicant 120 to the network 100. At line 225, the MP supplicant 120 is authenticated with the MA 110. At line 230, a mesh authenticator pairwise master key (PMK-MA) is securely delivered from the MKD 115 to the MA 110. The PMK-MA is then used to complete association and routing procedures between the MP supplicant 120 and the MA 110.

Figure 3:
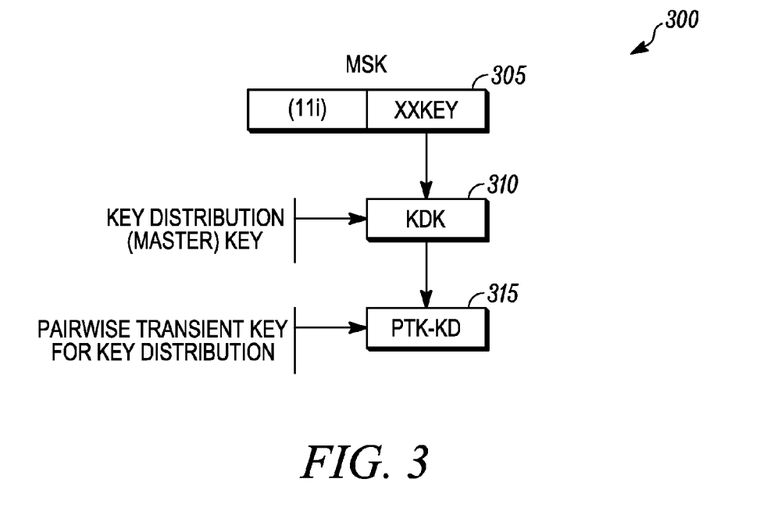
FIG. 3 is a block diagram illustrating a mesh key hierarchy, according to some embodiments of the present invention.

Referring to FIG. 3, a block diagram illustrates a mesh key hierarchy 300, according to some embodiments of the present invention. At the top of the hierarchy 300, at block 305, is a master shared key (MSK) that is installed when the MA 110 first joins the network 100, and is generated during a mesh authenticator extensible authentication protocol (EAP) process. Two additional keys are then derived from the MSK. At block 310, a key distribution key (KDK) is derived from a portion of the MSK and serves as a master key delivery key. At block 315, a pairwise transient key for key distribution (PTK-KD) is then derived from the KDK during a mesh authenticator security establishment protocol, which is described in detail below. Finally, the PTK-KD is subdivided into two individual keys (not shown), namely a key encrypting key used for key distribution (KEK-KD) and a key confirmation key (KCK-KD) used to provide data origin authenticity in messages exchanged between the MA 110 and the MKD 115 for key delivery and key holder security association.

Establishing a mesh key holder security association begins with discovery of the MKD 115, followed by a handshake initiated by the MA 110. The result of the security association is the PTK-KD, used to provide the security services between the MA 110 and the MKD 115. During discovery of the MKD 115, the MA 110 learns an MKD identification (MKD-ID) of the MKD 115. The MA 110 obtains the MKD-ID during the initial EMSA authentication, as shown at line 205 in FIG. 2. After discovery, the MA 110 may initiate a mesh key holder security handshake by contacting the MKD 115 identified by the MKD-ID. The mesh key holder security handshake may commence after the MA 110 has completed its initial EMSA authentication. That mechanism permits the MA 110 to establish a security association with the MKD 115 that derived a mesh key distributor pairwise master key (PMK-MKD) during initial EMSA authentication.

Mesh Authenticator Security Establishment

Figure 4:
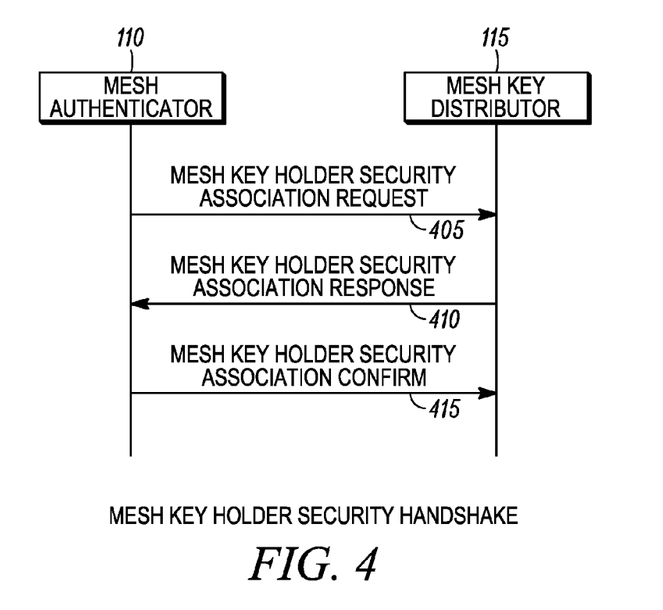
FIG. 4 is a message sequence chart illustrating a mesh key holder security handshake between a Mesh Authenticator (MA) and a Mesh Key Distributor (MKD), according to some embodiments of the present invention.

Referring to FIG. 4, a message sequence chart illustrates a mesh key holder security handshake between the MA 110 and the MKD 115, according to some embodiments of the present invention. At line 405, the MA 110 initiates an exchange by constructing a mesh key holder security association request message and sending the request message to the MKD 115. For example, according to some embodiments of the present invention, the request message comprises the following:

a medium access control (MAC) address of the MKD 115 in a destination address (DA) field of a message header;

a MAC address of the MA 110 in a source address (SA) field of the message header;

a mesh identification (ID) information element (IE) including a Mesh ID that the MA 110 advertises in beacons and probe responses;

a mesh security domain information element (MSDIE) including a value of a mesh security domain identifier (MSD-ID) contained in a MSDIE received in an Association Response during the initial EMSA authentication of the MA 110 (the MA 110 uses an MSDIE to advertise its status as an MA, and to advertise that it is included in the group of MAs that constitute a mesh security domain); and a mesh key holder security information element (MKH-SIE) having values set as follows:
an MA-Nonce value set randomly by the MA 110;
an MA-ID set to the MAC address of the MP;
an MKD-ID set to the MAC address of the MKD 115; and
all other fields set to zero.

Upon receiving the request message, the MKD 115 chooses an MKD-Nonce value, which is a value chosen randomly, and computes a pairwise transient key for key distribution (PTK-KD) using the MA-Nonce received in the request message and the MKD-Nonce value. At line 410, the MKD 115 then sends a mesh key holder security information response message. For example, according to some embodiments of the present invention, the response message comprises the following:

a medium access control (MAC) address of the MKD 115 in a destination address (DA) field of a message header;

a MAC address of the MA 110 in a source address (SA) field of the message header;

a mesh identification (ID) information element (IE) including a Mesh ID;

a mesh security domain information element (MSDIE) including a value of a mesh security domain identifier (MSD-ID);

a mesh key holder security information element (MKH-SIE) having values set as follows:
MA-Nonce, MA-ID, and MKD-ID values set to the values contained in the request message sent at line 405;
an MKD-Nonce value set to a value chosen randomly by the MKD 115;
a message integrity check (MIC) algorithm subfield of a MIC control field set to indicate a cryptographic algorithm used to calculate a MIC;
an information element (IE) count subfield of the MIC control field set to the number of information elements in a present frame;
a MIC value calculated using a key confirmation key for key distribution (KCK-KD), by an algorithm selected by a MIC algorithm subfield, on a concatenation in the following order:
MAC address of the MA 110;
MAC address of the MKD 115;
Handshake sequence number (1 octet), set to the value 2;
Contents of the Mesh ID IE;
Contents of the MSDIE; and
Contents of the MKHSIE, with the MIC field set to 0.

As is well known in the art, the MIC is a calculated value that may accompany data to provide assurance about its integrity. The inputs to a MIC calculation include data to be protected, and a secret key. The MIC provides data origin authenticity and message integrity to a recipient. Data origin authenticity assures the recipient that the sender was someone possessing the secret key. Further, when only two parties know the secret key, it provides the recipient assurance of the identity of the sender. Message integrity assures the recipient that the protected data were not modified during transmission. As used in this specification, a MIC is analogous to a "message authentication code" as is known in the field of cryptography. Those skilled in the art will appreciate that operations of a MIC, according to some embodiments of the present invention, could also be performed using various other types of data origin information that can provide data origin authenticity and message integrity.

Upon receiving the response message at line 410, the MA 110 derives the PTK-KD, and confirms that the MKD 115 has correctly derived the PTK-KD. At line 415, the MA 110 sends a mesh key holder security association confirm message. For example, according to some embodiments of the present invention, the confirm message comprises the following:

- a medium access control (MAC) address of the MKD 115 in a destination address (DA) field of a message header;
- a MAC address of the MA 110 in a source address (SA) field of the message header;
- a Mesh ID IE containing a Mesh ID IE received in the response message at line 410.
- An MSDIE containing the MSDIE received in the response message at line 410.
- an MKHSIE set as follows:
  - MA-Nonce, MKD-Nonce, MA-ID, and MKD-ID values set to the values contained in the response message received at line 410;
  - A MIC algorithm subfield of the MIC control field set to indicate a cryptographic algorithm used to calculate the MIC;
  - an information element count subfield of the MIC control field set to the number of information elements in a present frame.
  - A MIC value calculated using a key confirmation key for key distribution (KCK-KD), by an algorithm selected by a MIC algorithm subfield, on concatenation in the following order:
    - MAC address of the MA 110;
    - MAC address of the MKD 115;
    - Handshake sequence number (1 octet), set to the value 3;
    - contents of the Mesh ID IE;
    - contents of the MSDIE; and
    - contents of the MKHSIE, with the MIC field set to 0.

Figure 5:
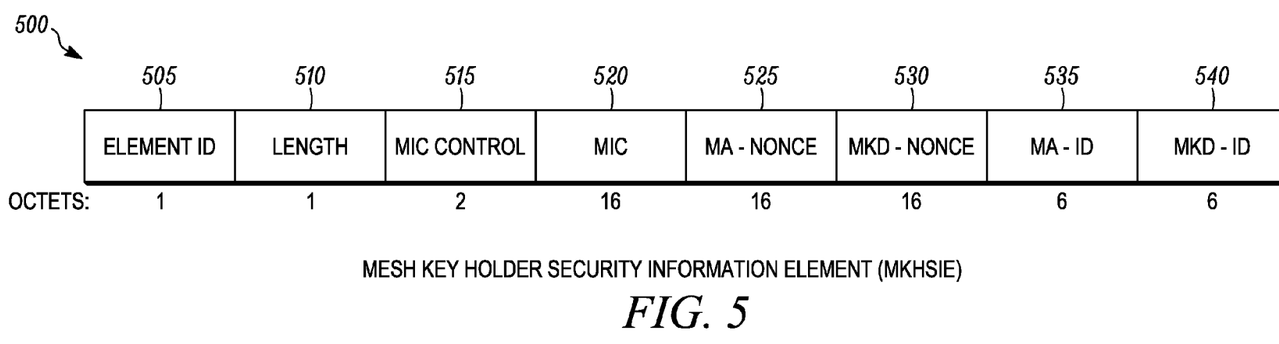
FIG. 5 is a block diagram illustrating an exemplary field structure of a Mesh Key Holder Security Information Element (MKHSIE), which can be used to request, deliver, or confirm a Mesh Authenticator Pairwise Master Key (PMK-MA), according to some embodiments of the present invention.

Referring to FIG. 5, a block diagram illustrates an exemplary field structure 500 of a Mesh Key Holder Security Information Element (MKHSIE), which can be used to request, deliver, or confirm a PMK-MA, according to some embodiments of the present invention. Block 505 is an Information Element (IE) Identification (ID) field that identifies a particular MKHSIE. Block 510 is a Length field, which defines a length of the MKHSIE. Block 515 is a MIC Control field that comprises a MIC algorithm field and an Information element count field, which includes the number of information elements that are included in the MIC calculation. Block 520 is a MIC field that includes a MIC value calculated using an algorithm selected by the MIC algorithm field of the MIC Control field. Block 525 is a MA-Nonce field that contains a nonce value chosen by the MA 110. Block 530 is a MKD-Nonce field that includes a nonce value chosen by the MKD 115. Block 535 is a MA-ID field that includes the MAC address of the MA 110. Block 540 is a MKD-ID field that includes the MAC address of the MKD 115.

Mesh Key Delivery

Embodiments of the present invention provide for a mesh key transport protocol comprising a method by which the MKD 115 securely transmits a derived PMK-MA to the MA 10, along with key context and additional related information. An additional management protocol permits the MKD 115 to request the MA 110 to delete a PMK-MA that has previously been delivered.

In accordance with some embodiments of the present invention, two protocols are defined for delivery of a PMK-MA, each consisting of two messages. A pull protocol is initiated by the MA 110 by sending a PMK-MA request message, followed by the MKD 115 delivering the PMK-MA. A push protocol is initiated by the MKD 115 delivering (unsolicited) the PMK-MA, followed by the MA 110 sending a confirmation message. The MA 110 and the MKD 115 maintain separate key replay counters for use in these protocols. In the pull protocol, a key replay counter of the MA 110 is used to protect a first message, which the MA 110 sends. In the push protocol, the key replay counter of the MKD 115 is used to protect a first message, which the MKD 115 sends.

In each protocol, prior to sending the first message, the sender increments the value of its replay counter. Upon receiving the first message, the recipient verifies that the replay counter value contained in the first message is a value not yet used by the sender in a first message. If the replay counter value has been previously used, the message is discarded. Thus, the MA 110 and the MKD 115 each maintain the state of two replay counters: the counter used to generate a value for a first messages sent from the node maintaining the counter, and a counter used to detect replay in a first message received by the node maintaining the counter. Further, the second message of each protocol contains a replay counter value that equals the value in the first message of the protocol, which permits matching messages within a protocol instance.

Mesh Key Transport Pull Protocol

Figure 6:
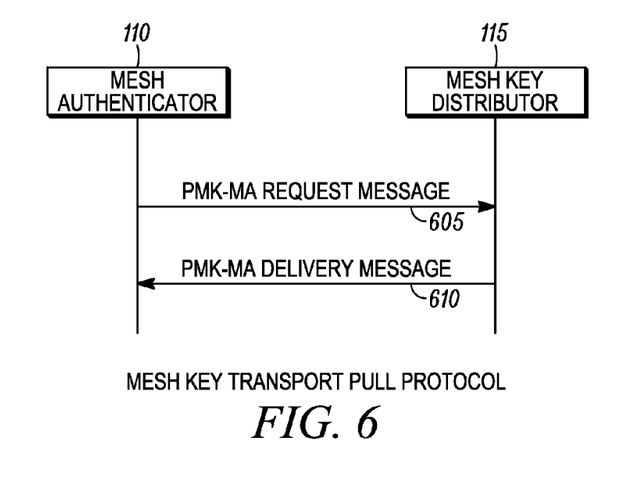
FIG. 6 is a message sequence chart illustrating a key transport pull protocol, according to some embodiments of the present invention.

Referring to FIG. 6, a message sequence chart illustrates a mesh key transport pull protocol, according to some embodiments of the present invention. At line 605, a PMK-MA request message is sent from the MA 110 to the MKD 115. At line 610, a PMK-MA delivery message is sent from the MKD 115 to the MA 110. Both messages contain a MIC for integrity protection, and the PMK-MA being delivered is encrypted.

According to some embodiments of the present invention, a PMK-MA request message comprises the following elements. The MAC address of the MKD 115 is provided in a DA field of a message header, and the MAC address of the MA 110 is provided in an SA field of the message header. Prior to constructing the PMK-MA request message, the value of the replay counter of the MA 110 associated with the PTK-KD is incremented by one. An MSDIE is then configured as advertised by the MA 110 in its beacons and probe responses.

According to some embodiments of the present invention, the PMK-MA request message also comprises a mesh encrypted key information element (MEKIE). The contents of the MEKIE are as follows:

- a replay counter set to the value of the replay counter of the MA 110;
- a supplicant address (SPA) set to the MAC address of the MP supplicant 120 that, during its initial EMSA authentication, generated the mesh key hierarchy that includes the PMK-MA being requested;
- a PMK-MKDName field set to the identifier of the key from which the PMK-MA being requested was derived;
- a MIC algorithm subfield of a MIC control field set to indicate the cryptographic algorithm used to calculate the MIC;
- an information element count field of a MIC control field set to two, which is the number of information elements in a present frame;

a MIC calculated using a key confirmation key for key distribution (KCK-KD), by an algorithm selected by a MIC algorithm subfield, on concatenation in the following order:
  MAC address of the MA 110;
  MAC address of the MKD 115;
  a field indicating message of type PMK-MA request, set to the value 3;
  contents of the MSDIE; and
  contents of the MEKIE, with the MIC field set to 0; and
an ANonce and an Encrypted Contents Length field set to 0.

Upon receiving the PMK-MA request message, the MKD 115 verifies the MIC, and verifies that the replay counter field in the MEKIE contains a value not previously used with the PTK-KD in a first message sent by the MA 10. If verified, the MKD 115 may attempt to derive the PMK-MA for use between the MP supplicant 120 identified by SPA and the MA 110 that sent the PMK-MA request message, using the key identified by the PMK-MKDName field. Subsequently, the MKD 115 constructs and sends the PMK-MA delivery message.

After the MA 110 receives the PMK-MA delivery message from the MKD 115, the MA 110 decrypts the PMK-MA and then uses the PMK-MA to continue the security establishment with the MP supplicant 120. That enables a fast link establishment that connects the MP supplicant 120 to the network 100 using, for example, IEEE 802.11 standards, rather than requiring use of higher-layer protocols.

Figure 7:
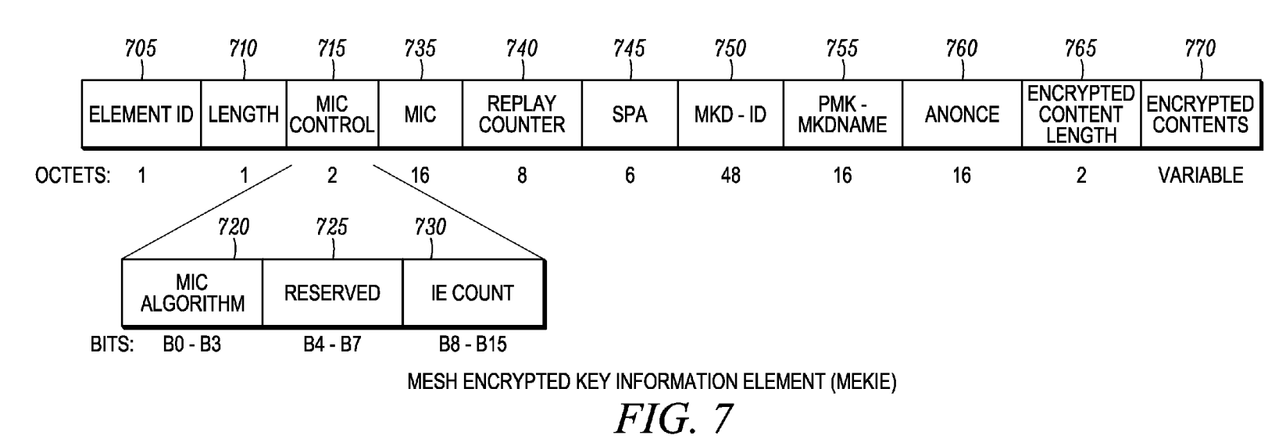
FIG. 7 is a block diagram illustrating an exemplary field structure of a Mesh Encrypted Key Information Element (MEKIE), which can be used to request, deliver, or confirm a PMK-MA, according to some embodiments of the present invention.

Referring to FIG. 7, a block diagram illustrates an exemplary field structure 700 of a mesh encrypted key information element (MEKIE), which can be used to request, deliver, or confirm a PMK-MA, according to some embodiments of the present invention. Block 705 is an Information Element ID field. Block 710 is a length field indicating a length of the MEKIE. Block 715 is a MIC Control field having the following subfields: block 720 is a MIC algorithm field, block 725 is a reserved field, and block 730 is an information element (IE) count field that indicates the number of information elements protected by a MIC. Block 735 is a message integrity check (MIC) field that, as described above, contains a check value calculated using a pairwise key. The check value of the MIC protects the contents of the MEKIE and additional header information.

Block 740 is a replay counter field that permits matching a second message to a first message in a two-message sequence, and prevents replays of previous messages. In a first message of a sequence, the replay counter field contains a counter value not yet used with a key used to calculate the MIC (i.e., a key confirmation key for key distribution (KCK-KD)). In a second message of a sequence, the replay counter field contains the value from the first message of the sequence.

Block 745 is a supplicant address (SPA) that provides the address of the MP supplicant 120 that created the PMK-MA. Block 750 is a MKD-ID field that contains an identifier of the MKD 115 participating in the exchange of a present MEKIE. Block 755 is a PMK-MKDName field that contains the identifier of a master key from which the PMK-MA was derived. Block 760 is an ANonce field that contains the nonce used by the MKD 115 in calculating the PMK-MKDName field. Block 765 is an Encrypted Contents Length field that is the length of an Encrypted Contents field shown at block 770. The Encrypted Contents field is a variable length field used to transport the PMK-MA and related information (i.e., "context"), and all information in the field is encrypted using an algorithm such as, for example, an Advanced Encryption Standard (AES) Key Wrap, which is well known in the art.

The second message of the key transport pull protocol, the PMK-MA delivery message, can comprise the following elements, according to some embodiments of the present invention. The MAC address of the MA 110 is provided in a DA field of a message header, and the MAC address of the MKD 115 is provided in the SA field of the message header. The MSDIE contains the MSDIE received in the PMK-MA request message.

The PMK-MA delivery message of a key transport pull protocol also includes a MEKIE, comprising the following:
  a replay counter set to the value of the replay counter in the PMK-MA request message;
  an SPA set to the value contained in the PMK-MA request message;
  a PMK-MKDName set to the value contained in the PMK-MA request message if an encrypted PMK-MA is included in the Encrypted Contents field (if the Encrypted Contents field is omitted, then PMK-MKDName is set to zero);
  an ANonce set to a random value that was selected by the MKD 115 for derivation of the PMK-MKDName that was indicated in the PMK-MA request message;
  an Encrypted Contents Length field set to the length in octets of the Encrypted Contents field, or set to zero if the Encrypted Contents field is omitted;
  Encrypted Contents set as follows:
    If the MKD 115 does not have a PMK-MA to send to the MA 110 (e.g., it was unable to derive the key), the Encrypted Contents field is omitted;
    If the MKD 115 is sending a PMK-MA to the MA 110, then the Encrypted Contents field contains the concatenation: key_data={PMK-MA||PMK-MAName||Lifetime KDE};
      Lifetime KDE is a 4-octet value containing the number of seconds remaining in the lifetime of the PMK-MA;
      If the MIC algorithm is, e.g., the hash based message authentication code HMAC-MD5, as is well known in the art, then the concatenation key data are encrypted using KEK-KD and the stream cipher ARC4, as is well known in the art, prior to being inserted in the Encrypted Contents field.
      If the MIC algorithm is, e.g., the hash based message authentication code HMAC-SHA1-128, as is well known in the art, then the concatenation key data are encrypted using KEK-KD and the NIST AES Key Wrap algorithm, as is well known in the art and defined in the Request For Comments RFC 3394, prior to being inserted in the Encrypted Contents field;
  a MIC algorithm of the MIC control field set to indicate the cryptographic algorithm used to calculate the MIC;
  an Information element count field of the MIC control field set to 2, i.e., the number of information elements in the present frame;
  a MIC calculated using the KCK-KD, by the algorithm selected by the MIC algorithm subfield, on the concatenation in the following order:
    MAC address of the MA 110;
    MAC address of the MKD 115;
    a field indicating message of type PMK-MA pull protocol delivery, set to the value 4;
    contents of the MSDIE; and
    contents of the MEKIE, with the MIC field set to 0.

Upon receiving the PMK-MA delivery message, the MA 110 verifies the MIC, and verifies that the replay counter field contains the value given in the PMK-MA request message.

Mesh Key Transport Push Protocol

Figure 8:
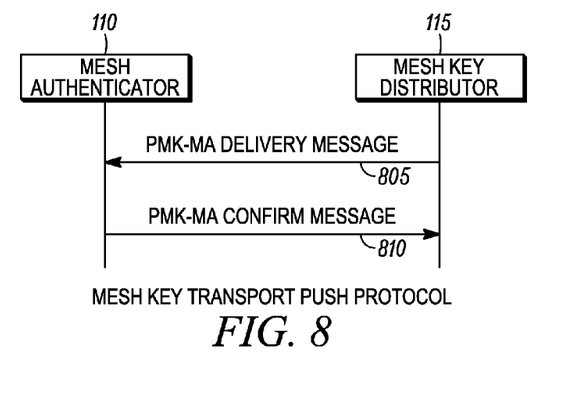
FIG. 8 is a message sequence chart illustrating a key transport push protocol, according to some embodiments of the present invention.

Referring to FIG. 8, a message sequence chart illustrates a mesh key transport push protocol, according to some embodiments of the present invention. At line 805, a PMK-MA delivery message is sent from the MKD 115 to the MA 110. At line 810, a PMK-MA confirm message is sent from the MA 110 to the MKD 115.

According to some embodiments of the present invention, both the PMK-MA delivery message and the PMK-MA confirm the message contains a MIC for integrity protection, and the PMK-MA being delivered is encrypted. The PMK-MA delivery message of a key transport push protocol can comprise the following elements. The MAC address of the MA 110 is provided in the DA field of a message header, and the MAC address of the MKD 115 is provided in the SA field of the message header. Prior to constructing the PMK-MA delivery message, the value of the replay counter of the MKD 115 associated with the PTK-KD is incremented by 1. The PMK-MA delivery message also includes an MSDIE containing an MSD-ID.

The PMK-MA delivery message of a key transport push protocol also includes a MEKIE, comprising the following:
  a replay counter set to the value of the replay counter of the MKD 115;
  an SPA set to the MAC address of the MP supplicant 120 that, during its Initial EMSA Authentication, generated the mesh key hierarchy that includes the PMK-MA being delivered;
  a PMK-MKDName set to the identifier of the key from which the PMK-MA being delivered was derived;
  an ANonce set to the random value that was selected by the MKD for derivation of the PMK-MKDName indicated in the present message;
  an Encrypted Contents Length field set to the length in octets of the Encrypted Contents field;
  an Encrypted Contents field containing the concatenation: key_data={PMK-MA∥PMK-MAName∥Lifetime KDE};
    Lifetime KDE is a 4-octet value containing the number of seconds remaining in the lifetime of the PMK-MA;
    if the MIC algorithm is, e.g., the hash based message authentication code HMAC-MD5, then the concatenation key data are encrypted using KEK-KD and the stream cipher ARC4, prior to being inserted in the Encrypted Contents field;
    if the MIC algorithm is, e.g., HMAC-SHA1-128, then the concatenation key data are encrypted using KEK-KD and the NIST AES Key Wrap algorithm, as defined in the Request For Comments RFC 3394, prior to being inserted in the Encrypted Contents field;
  a MIC algorithm subfield of the MIC control field set to indicate the cryptographic algorithm used to calculate the MIC;
  an Information element count field of the MIC control field set to 2, the number of information elements in the present frame;
  a MIC calculated using the KCK-KD, by the algorithm selected by the MIC algorithm subfield, on the concatenation in the following order:
    MAC address of the MA 110;
    MAC address of the MKD 115;
    a field indicating message of type PMK-MA push protocol delivery, set to the value 1;
    contents of the MSDIE; and
    contents of the MEKIE, with the MIC field set to 0.

Upon receiving the PMK-MA delivery message, the MA 110 verifies the MIC, and verifies that the replay counter field contains a value not previously used with the PTK-KD in a first message sent by the MKD 115. If verified, the MA 110 then sends a PMK-MA confirm message to the MKD 115.

The second message of the key transport push protocol, the PMK-MA confirm message, can comprise the following elements, according to some embodiments of the present invention. The MAC address of the MKD 115 is provided in the DA field of a message header, and the MAC address of the MA 110 is provided in the SA field of the message header. An MSDIE includes the MSDIE received in the PMK-MA delivery message.

The PMK-MA confirm message of a key transport push protocol also includes a MEKIE, comprising the following:
  a replay counter set to the value of the replay counter in the PMK-MA delivery message;
  an SPA, PMK-MKDName, and ANonce set to the values contained in the PMK-MA delivery message.
  an Encrypted Contents Length field set to 0 (as the Encrypted Contents field is omitted);
  a MIC algorithm subfield of the MIC control field set to indicate the cryptographic algorithm used to calculate the MIC;
  an Information element count field of the MIC control field set to 2, the number of information elements in the present frame; and
  a MIC calculated using the KCK-KD, by the algorithm selected by the MIC algorithm subfield, on the concatenation in the following order:
    MAC address of the MA 110;
    MAC address of the MKD 115;
    a field indicating message of type PMK-MA confirm, set to the value 2;
    contents of the MSDIE; and
    contents of the MEKIE, with the MIC field set to 0.

Upon receiving the PMK-MA confirm message, the MKD 115 verifies the MIC, and verifies that the replay counter field contains the value that the MKD 115 sent in the PMK-MA delivery message.

Figure 9:
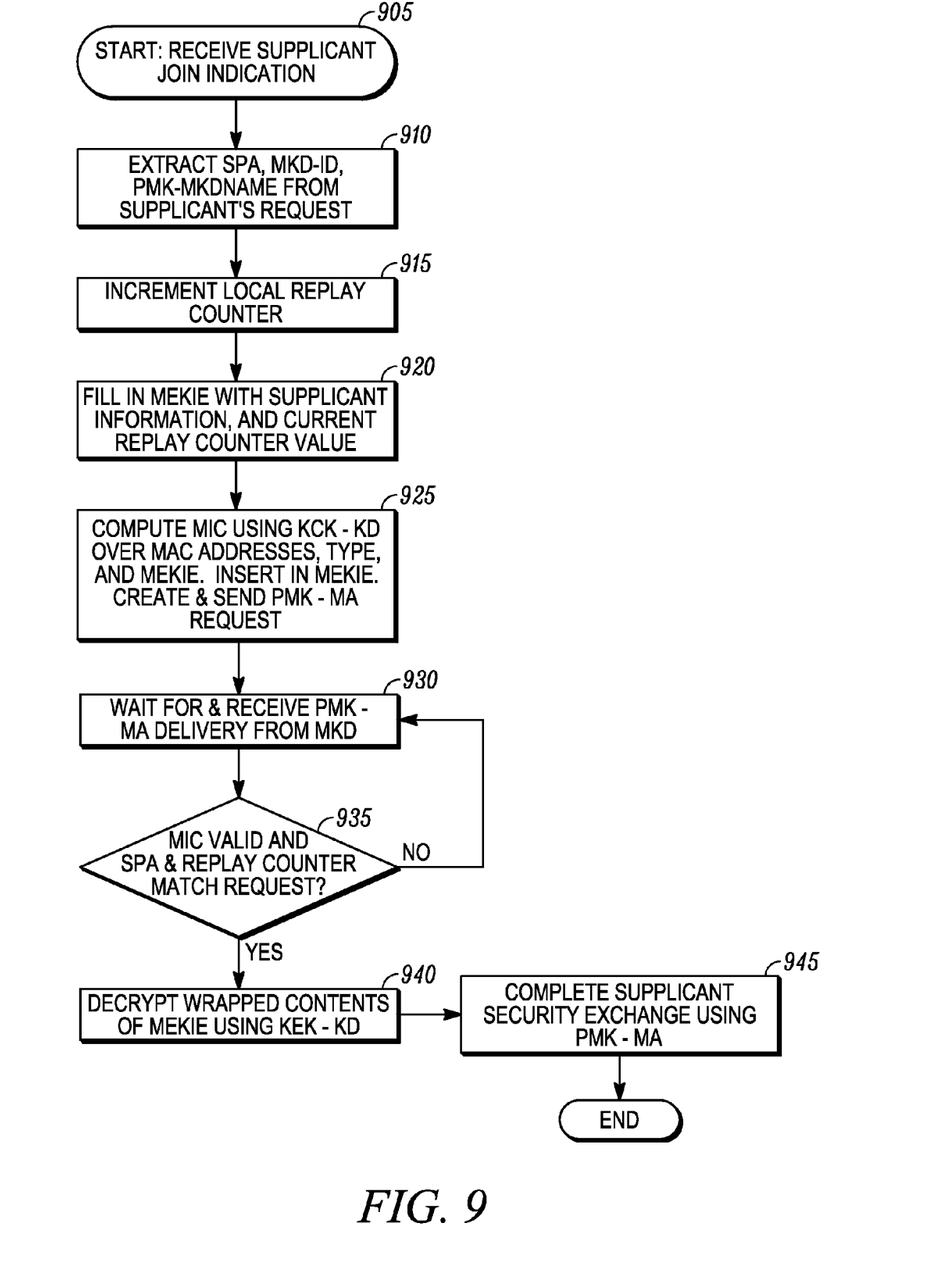
FIG. 9 is a general flow diagram illustrating a method for delivery of a PMK-MA from a MKD to an MA using a mesh key transport pull protocol, from the perspective of the MA, according to some embodiments of the present invention.

Referring to FIG. 9, a general flow diagram illustrates a method 900 for delivery of a PMK-MA from the MKD 115 to the MA 110 using a mesh key transport pull protocol, from the perspective of the MA 110, according to some embodiments of the present invention. At block 905, the MA 110 receives a supplicant join indication from the MP supplicant 120. At block 910, the MA 110 extracts an SPA, MKD-ID, and PMK-MKDName value from a supplicant request. At block 915, a local replay counter is incremented. At block 920, the MA 110 creates a MEKIE with information about the MP supplicant 120 and a current replay counter value. At block 925, the MA 110 computes a MIC using a KCK-KD over MAC addresses, type, and MEKIE values, and the MIC is inserted into the MEKIE. A PMK-MA request message is then transmitted from the MA 110 to the MKD 115.

At block 930, the MA 110 waits for and then receives a PMK-MA delivery message from the MKD 115. At block 935, the MA 110 determines whether the MIC is valid and whether a SPA and a replay counter in the PMK-MA delivery message match the corresponding values in the PMK-MA request message. If not, then the method returns to block 930 where the MA 110 continues to wait for another PMK-MA delivery message. If the MIC is valid and a SPA and a replay counter in the PMK-MA delivery message match the corresponding values in the PMK-MA request message, then at block 940, the wrapped contents of the MEKIE are decrypted using, for example, the key encryption key for key distribution (KEK-KD) portion of the PTK-KD. Finally, at block 945, the MA 110 completes a security exchange with the MP supplicant 120 using the PMK-MA.

Figure 10:
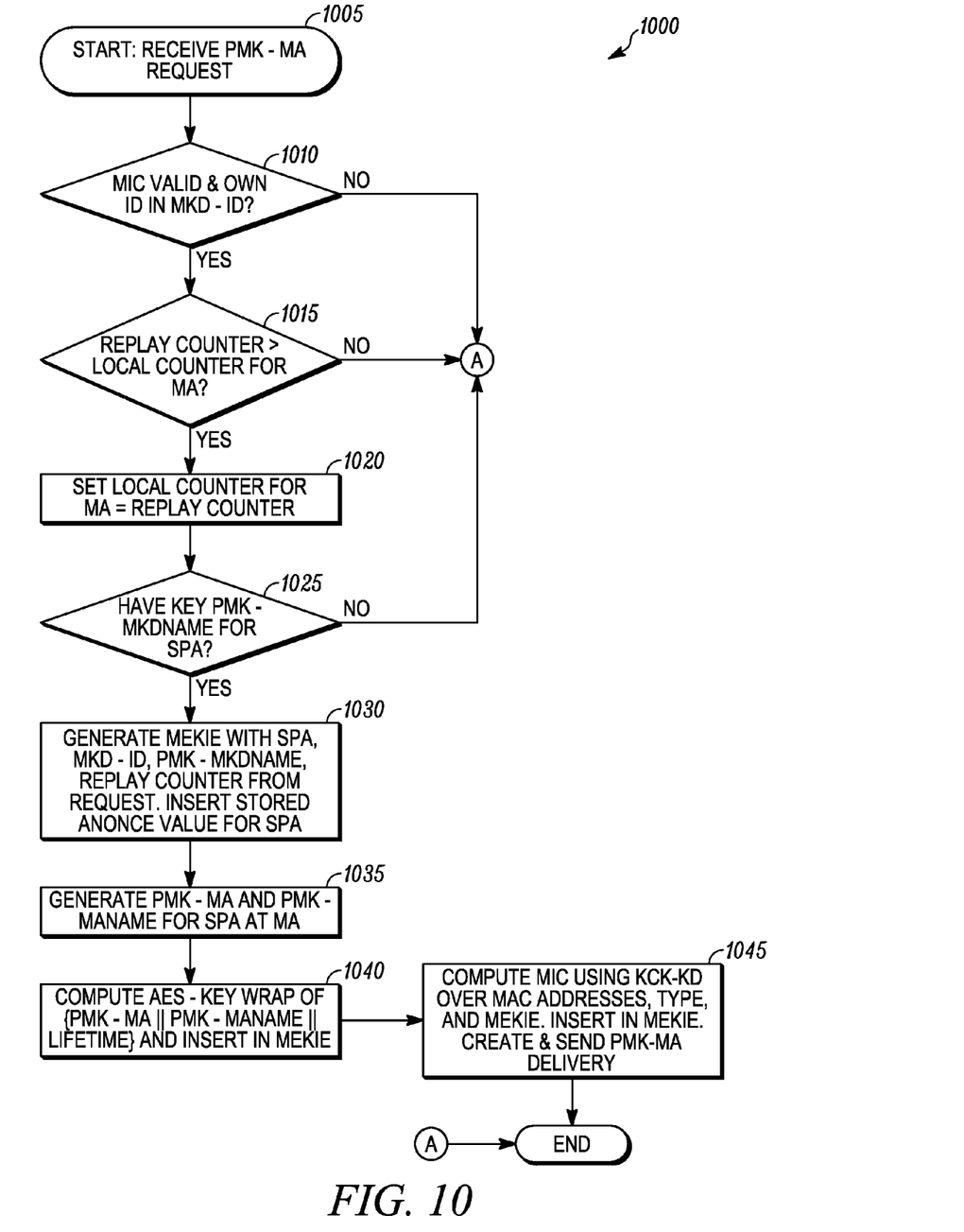
FIG. 10 is a general flow diagram illustrates a method for delivery of a PMK-MA from an MKD to an MA using a mesh key transport pull protocol, from the perspective of the MKD, according to some embodiments of the present invention.

Referring to FIG. 10, a general flow diagram illustrates a method 1000 for delivery of a PMK-MA from the MKD 115 to the MA 110 using a mesh key transport pull protocol, from the perspective of the MKD 115, according to some embodiments of the present invention. At block 1005, the MKD 115 receives the PMK-MA request message from the MA 110. At block 1010, the MKD 115 determines whether the MIC is valid and whether its own ID is the MKD-ID in the PMK-MA request message. If not, then the method 1000 ends. If so, then at block 1015 the MKD 115 determines whether the replay counter in the PMK-MA request message is greater than a local counter for the MA 110. If not, then the method 1000 ends. If so, then at block 1020 the MKD 115 sets a local counter for the MA 110 equal to the replay counter. At block 1025, the MKD 115 determines whether it has a key identified by the value PMK-MKDName for the SPA identified in the PMK-MA request message. If not, then the method 1000 ends. If so, then at block 1030 the MKD 115 generates a MEKIE having SPA, MKD-ID, PMK-MKDName, and replay counter values from the PMK-MA request message. A stored ANonce value is inserted for the SPA.

At block 1035, the method 1000 continues where the MKD 115 generates the PMK-MA and a PMK-MAName for the SPA. At block 1040, the MKD 115 computes an AES-Key Wrap of the concatenation: {PMK-MA‖PMK-MAName‖Lifetime} using the KEK-KD portion of the PTK-KD to generate key transport ciphertext, and inserts the key transfer ciphertext into the MEKIE. At block 1045, the MKD 115 computes a MIC using a KCK-KD portion of the PTK-KD over the MAC addresses, type, and MEKIE values and inserts the MIC into the MEKIE. Finally, the MKD 115 creates and sends the PMK-MA delivery message to the MA 110.

Figure 11:
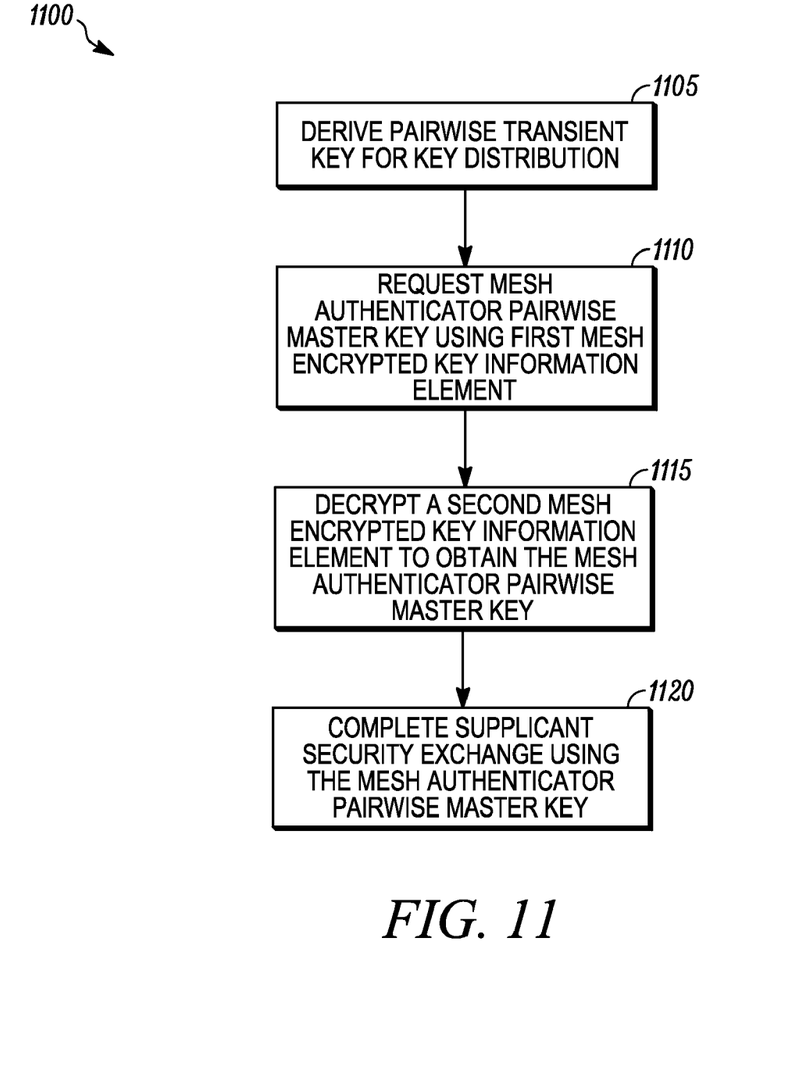
FIG. 11 is a general flow diagram illustrating a method for secure processing of authentication key material in a mesh network, from the perspective of an MA, according to some embodiments of the present invention.

Referring to FIG. 11, a general flow diagram illustrates a method for secure processing of authentication key material in an ad hoc wireless network, from the perspective of a mesh authenticator, according to some embodiments of the present invention. At block 1105, a pairwise transient key for key distribution is derived using a mesh key holder security information element. For example, as described above concerning mesh authenticator security establishment, a PTK-KD is derived by the MA 110 using a MKHSIE during the mesh key holder security handshake between the MA 110 and the MKD 115.

At block 1110, a mesh authenticator pairwise master key is requested using a first mesh encrypted key information element that includes data origin information. For example, as described above, a PMK-MA is requested in a mesh key transport pull protocol, where the MA 110 transmits a PMK-MA request message including a MEKIE, and the MEKIE includes data origin information in the form of a MIC.

At block 1115, a second mesh encrypted key information element is decrypted, using the pairwise transient key for key distribution, to obtain the mesh authenticator pairwise master key. For example, as described above in relation to FIG. 9, a PMK-MA delivery message is decrypted by the MA 110 using the KEK-KD portion of the PTK-KD during a mesh key transport pull protocol.

At block 1120, a supplicant security exchange is completed using the mesh authenticator pairwise master key. For example, as described above, the MA 110 completes a supplicant security exchange with the MP supplicant 120 using the PMK-MA obtained during the mesh key transport pull protocol.

Figure 12:
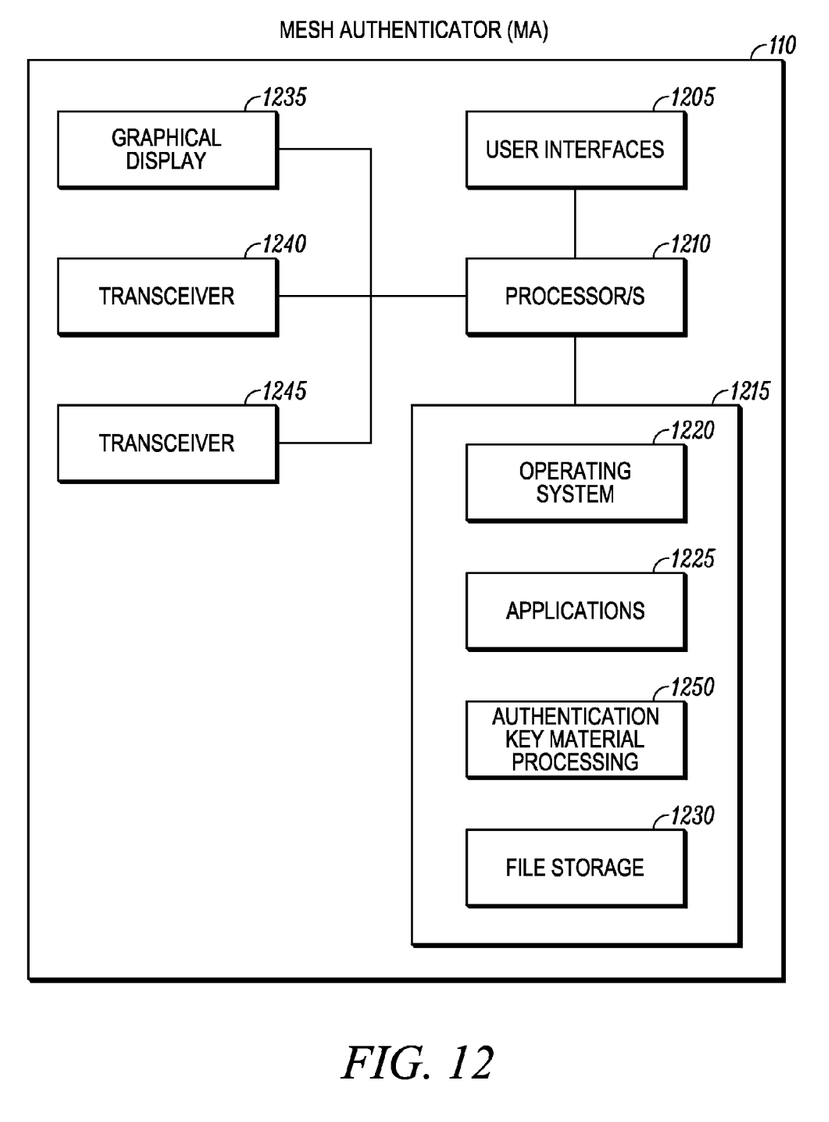
FIG. 12 is a block diagram illustrating components of an MA in a wireless communications mesh network, according to some embodiments of the present invention.

Referring to FIG. 12, a block diagram illustrates components of the Mesh Authenticator (MA) 110 in the wireless communications mesh network 100, for implementation of some embodiments of the present invention. The MA 110 can be one of various types of wireless communication devices such as, for example, a mobile telephone, personal digital assistant, two-way radio or notebook computer. The MA 110, alternatively, can be an ad hoc wireless device such as a mesh point or mesh router. The MA 110 comprises user interfaces 1205 operatively coupled to at least one processor 1210. At least one memory 1215 is also operatively coupled to the processor 1210. The memory 1215 has storage sufficient for an operating system 1220, applications 1225 and general file storage 1230. The general file storage 1230 may store, for example, values associated with MKHSIE or MEKIE information elements. The user interfaces 1205 may be a combination of user interfaces including, for example, but not limited to a keypad, touch screen, speaker and microphone. A graphical display 1235, which may also have a dedicated processor and/or memory, drivers etc., is operatively coupled to the processor 1210. One or more transceivers, such as a first transceiver 1240 and a second transceiver 1245, are also operatively coupled to the processor 1210. The first transceiver 1240 and the second transceiver 1245 may be for communicating with various wireless communications networks, such as the wireless communications mesh network 100, using various standards such as, but not limited to, Evolved Universal Mobile Telecommunications Service Terrestrial Radio Access (E-UTRA), Universal Mobile Telecommunications System (UMTS), Enhanced UMTS (E-UMTS), Enhanced High Rate Packet Data (E-HRPD), Code Division Multiple Access 2000 (CDMA2000), Institute of Electrical and Electronics Engineers (IEEE) 802.11, IEEE 802.16, and other standards.

It is to be understood that FIG. 12 is for illustrative purposes only and illustrates some components of the MA 110 in accordance with some embodiments of the present invention, and is not intended to be a complete diagram of the various components and connections there between required for all mesh authenticators that may implement various embodiments of the present invention.

The memory 1215 comprises a computer readable medium that records the operating system 1220, the applications 1225, and the file storage 1230. The computer readable medium also comprises computer readable program code components 1250 for secure processing of authentication key material. When the computer readable program code components 1250 are processed by the processor 1210, they are configured to cause the execution, for example, of the method 900 and the method 1100 as described above, according to some embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

We claim:

1. A method for secure processing of authentication key material in an ad hoc wireless network, the method comprising:
    deriving a pairwise transient key for key distribution using a mesh key holder security information element;
    requesting a mesh authenticator pairwise master key using a first mesh encrypted key information element that includes data origin information; and
    decrypting, using the pairwise transient key for key distribution, a second mesh encrypted key information element to obtain the mesh authenticator pairwise master key.

2. The method of claim 1, further comprising:
    completing a supplicant security exchange using the mesh authenticator pairwise master key.

3. The method of claim 1, wherein the mesh key holder security information element includes a message integrity check value.

4. The method of claim 1, wherein deriving the pairwise transient key for key distribution comprises processing a three message handshake with a mesh key distributor.

5. The method of claim 4, wherein the three message handshake comprises a mesh key holder security association request message, a mesh key holder security association response message, and a mesh key holder security association confirm message.

6. The method of claim 1, wherein deriving the pairwise transient key for key distribution comprises confirming that a mesh key distributor has correctly derived the pairwise transient key for key distribution.

7. The method of claim 1, wherein the pairwise transient key for key distribution comprises both a key encrypting key and a key confirmation key.

8. The method of claim 7, wherein the data origin information is computed using the key confirmation key and the second mesh encrypted key information element is decrypted using the key encrypting key.

9. The method of claim 1, wherein the pairwise transient key for key distribution is based on a master key generated during a mesh authenticator extensible authentication protocol authentication process.

10. The method of claim 1, wherein the mesh key holder security information element comprises an information count value that indicates a number of information elements protected by a message integrity check value.

11. The method of claim 1, wherein the mesh encrypted key information element comprises a replay counter.

12. The method of claim 1, wherein the data origin information comprises a message integrity check value.

13. The method of claim 1, wherein the second mesh encrypted key information element comprises encrypted contents, including the mesh authenticator pairwise master key, which are encrypted using an advanced encryption standard key wrap.

14. A system for secure processing of authentication key material in an ad hoc wireless network, the system comprising:
    a mesh authenticator operating to derive a pairwise transient key for key distribution using a mesh key holder security information element;
    the mesh authenticator operating to request a mesh authenticator pairwise master key using a first mesh encrypted key information element that includes data origin information; and
    the mesh authenticator operating to decrypt, using the pairwise transient key for key distribution, a second mesh encrypted key information element to obtain the mesh authenticator pairwise master key.

15. The system of claim 14, further comprising:
    the mesh authenticator operating to complete a supplicant security exchange using the mesh authenticator pairwise master key.

16. The system of claim 14, wherein the mesh key holder security information element includes a message integrity check value.

17. The system of claim 14, wherein deriving the pairwise transient key for key distribution comprises processing a three message handshake with a mesh key distributor.

18. The system of claim 17, wherein the three message handshake comprises a mesh key holder security association request message, a mesh key holder security association response message, and a mesh key holder security association confirm message.

19. The system of claim 14, wherein deriving the pairwise transient key for key distribution comprises confirming that a mesh key distributor has correctly derived the pairwise transient key for key distribution.

20. The system of claim 14, wherein the pairwise transient key for key distribution comprises both a key encrypting key and a key confirmation key.

21. The system of claim 20, wherein the data origin information is computed using the key confirmation key and the second mesh encrypted key information element is decrypted using the key encrypting key.

22. The system of claim 14, wherein the pairwise transient key for key distribution is based on a master key generated during a mesh authenticator extensible authentication protocol authentication process.

23. The system of claim 14, wherein the mesh key holder security information element comprises an information count value that indicates a number of information elements protected by a message integrity check value.

24. The system of claim 14, wherein the mesh encrypted key information element comprises a replay counter.

25. The system of claim 14, wherein the data origin information comprises a message integrity check value.

26. The system of claim 14, wherein the second mesh encrypted key information element comprises encrypted contents, including the mesh authenticator pairwise master key, which are encrypted using an advanced encryption standard key wrap.

* * * * *

UNITED STATES PATENT AND TRADEMARK OFFICE
CERTIFICATE OF CORRECTION

PATENT NO.       : 7,734,052 B2                                     Page 1 of 1
APPLICATION NO.  : 11/470921
DATED            : June 8, 2010
INVENTOR(S)      : Braskich et al.

It is certified that error appears in the above-identified patent and that said Letters Patent is hereby corrected as shown below:

On Title Page 2, Item (56), under "OTHER PUBLICATIONS", in Column 1, Line 10, delete "Secunty" and insert -- Security --, therefor.

On Title Page 2, Item (56), under "OTHER PUBLICATIONS", in Column 2, Line 29, delete "11 pages." and insert -- 9 pages. --, therefor.

In Column 7, Line 64, delete "10," and insert -- 110, --, therefor.

In Column 9, Line 16, delete "10." and insert -- 110. --, therefor.

Signed and Sealed this
Fourteenth Day of August, 2012

David J. Kappos
*Director of the United States Patent and Trademark Office*